March 16, 1943. N. M. McGRANE 2,313,956
DISPERSION MILL
Filed March 9, 1940 3 Sheets-Sheet 1
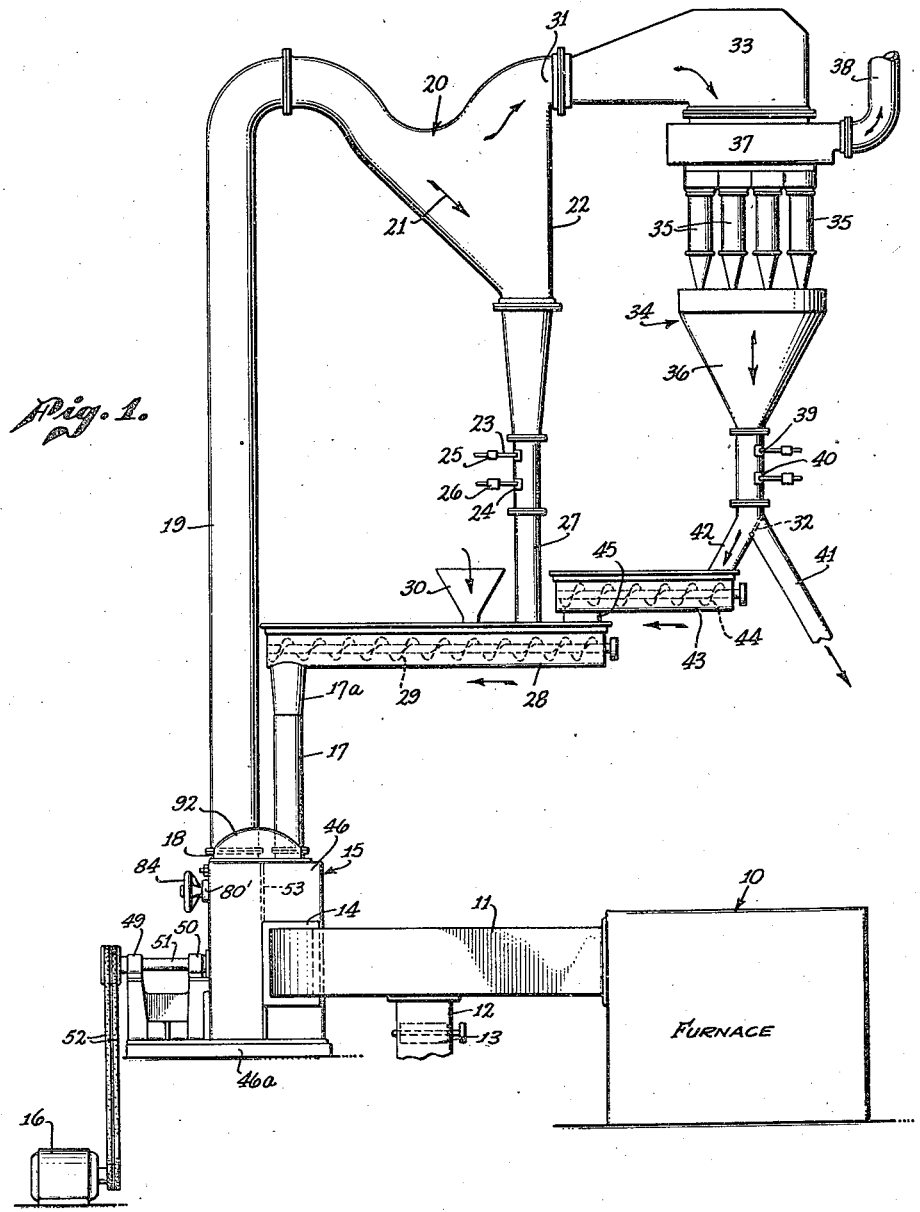

March 16, 1943.     N. M. McGRANE     2,313,956
DISPERSION MILL
Filed March 9, 1940     3 Sheets-Sheet 2

Inventor
NORMAN M. McGRANE,
By Alfred W. Knight
Attorney

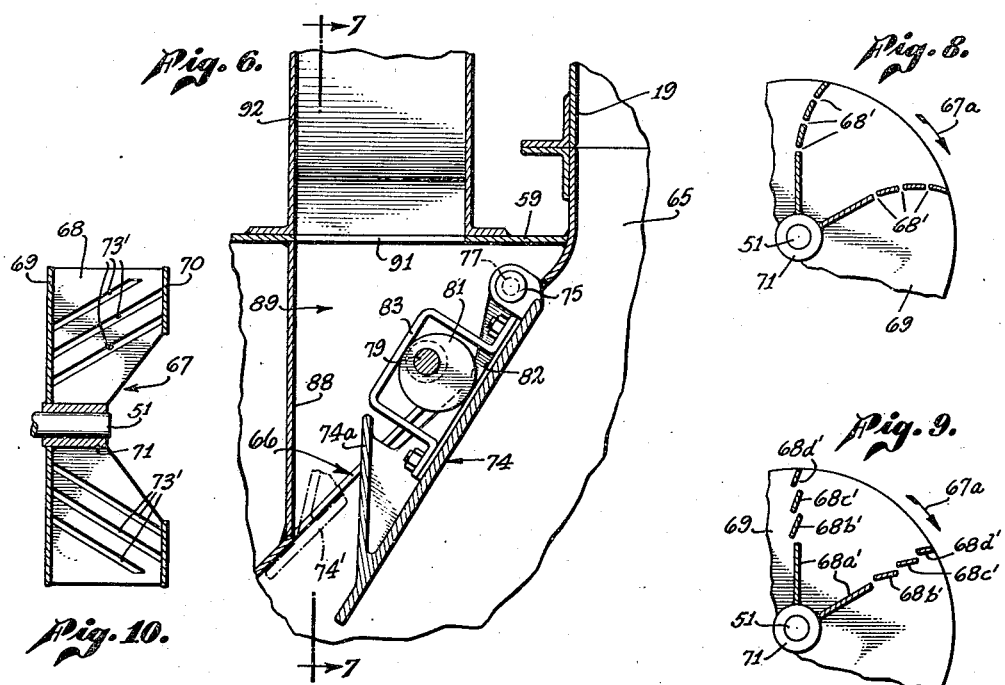
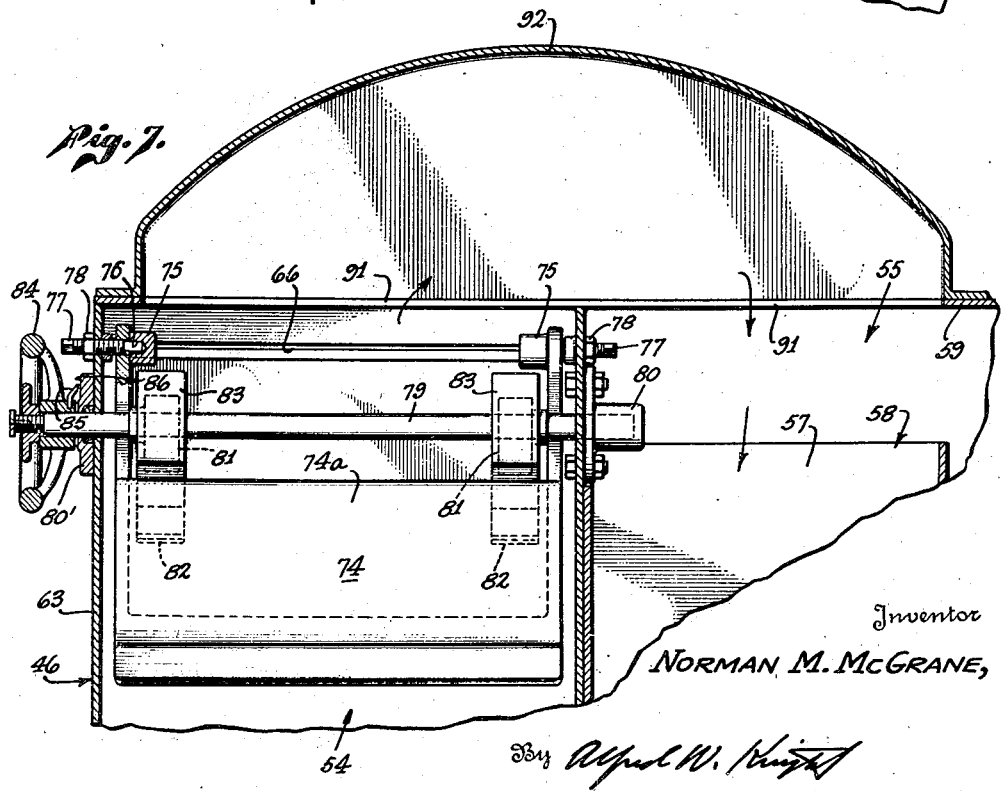

Patented Mar. 16, 1943

2,313,956

UNITED STATES PATENT OFFICE

2,313,956
DISPERSION MILL

Norman M. McGrane, Long Beach, Calif., assignor to Western Precipitation Corporation, Los Angeles, Calif., a corporation of California Application March 9, 1940, Serial No. 323,233

5 Claims. (Cl. 83—11)

My invention relates to a material heating system of the type in which a material containing solid particles, which is wet or contains chemically combined water, or some other constituent which may be removed by heat, is dispersed and circulated through the system by entraining the same in a divided condition in a high velocity gas or vapor, to effect rapid drying, or calcining to remove chemically combined water or other constituent.

Materials of the type suitable for treatment in a system of this kind are orange pulp, milk albumen, distillery slop, insoluble soap, cooked blood, garbage, sewage sludge, clays, filter cakes, inorganic sludges, and many other similar materials produced as an output of screens, filters, centrifugal dryers, drying trays, or other suitable mechanical devices for removing water, which reduce the water content to within a range of about five to sixty per cent. Other materials, such as gypsum, copper sulphate, or the like containing chemically combined water, are crushed and ground before being supplied to the system. All of these materials also are further dispersed in the system to increase the surface of the material, and violently agitated with the hot gas to promote rapid heating, and rapid removal of water or other volatile constituent therefrom.

An object of my invention is to provide a simplified material heating system. I accomplish this by providing an arrangement in which the hot gas and entrained material in a divided condition is impelled to move toward the conveying part of the system and the portion of the arrangement utilized for impelling the gas and entrained material toward the conveying portion is also utilized to disperse the entrained material. This further dispersing of the material promotes more rapid drying or calcining, and the combining of the impelling and dispersing functions simplifies the system.

Another object of my invention is to provide an improved material heating system, in which the relatively coarse portions of material in a divided condition are separated from the gas and from the relatively fine portions of the material and these coarse portions returned to the dispersing arrangement for further treatment. In this manner the desired fineness of the final product is obtained, and drying of the material in the system is facilitated. These separated relatively coarse portions may advantageously be mixed with fresh material supplied to the system, before being returned to the dispersing arrangement. The relatively fine portions of the material are then preferably separated from the gas and may be removed from the system as a final product, or may be in part returned with the separated coarse portions to the dispersing arrangement. These relatively fine and coarse portions of finely divided material also may be returned with the feed of material supplied to the system to the dispersing arrangement.

Another object of my invention is to provide an improved material dispersing and gas impelling device for a material heating system in which the gas impelling portion is utilized for dispersing the entrained material.

Another object of my invention is to provide a material dispersing device having an improved arrangement for returning to the dispersing portion relatively coarse portions of material.

Further objects and advantages of my invention will become apparent as the following description proceeds, and the features of novelty which characterize my invention will be pointed out with particularity in the claims annexed to and forming a part of this specification.

The accompanying drawings illustrate a particular embodiment of a system and apparatus for heating material embodying my invention and certain modifications thereof, and referring thereto:

Fig. 1 is a semi-diagrammatic side elevation of a material heating system embodying my invention;

Fig. 6 is an enlarged sectional view of a portion of the dispersion apparatus shown in Figs. 1 to 5, inclusive, showing the construction of a deflecting vane employed for directing relatively coarse portions of material from the whirling gas within the dispersion apparatus;

Fig. 7 is a sectional view on the line 7—7 in Fig. 6;

Fig. 8 is a fragmentary sectional view of a modified form of the rotatable element of the dispersion apparatus, taken in a plane perpendicular to the axis;

Fig. 9 is a view similar to Fig. 8 showing a further modification of the construction of the rotatable element; and Fig. 10 is a fragmentary sectional view of the rotatable element, taken in an axial plane and showing another modification of the construction.

Figure 3:
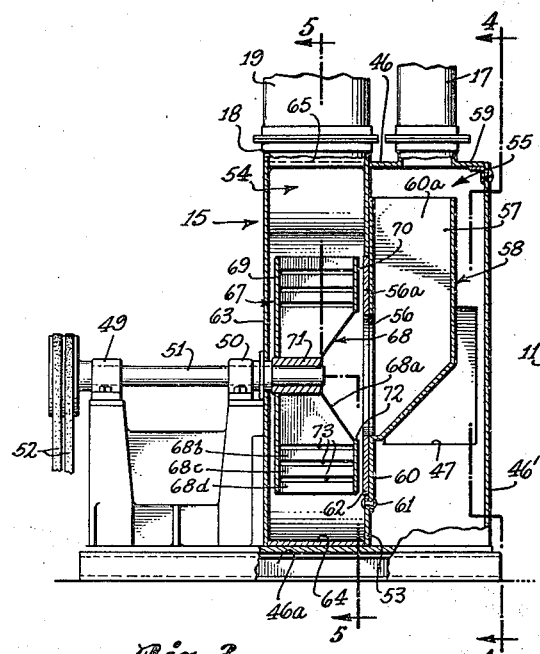
Fig. 3 is a partly sectional side elevation of the impelling and dispersing apparatus used in the system shown in Figs. 1 and 2.
Figure 4:
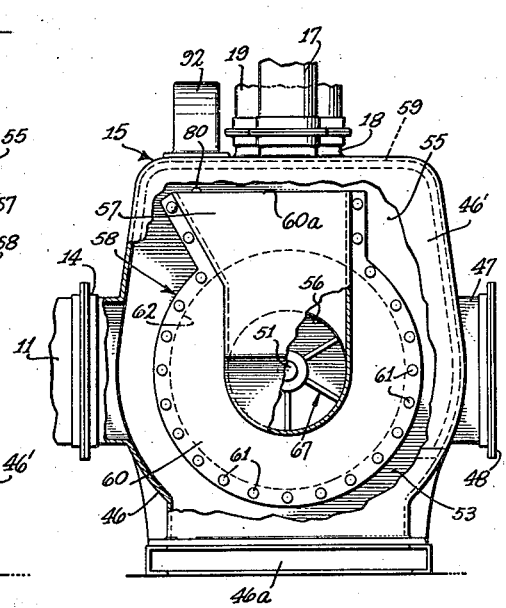
Fig. 4 is an end elevation of the construction shown in Fig. 3, partly broken away approximately as indicated by the line 4—4 in Fig. 3.

Referring to the drawings, the material heating system embodying my invention shown in Fig. 1 includes a furnace 10 for supplying hot air or other suitable gas or vapor, through a pipe 11. The temperature of this heated air or other gas may be controlled as desired by admitting thereto fresh air or other gas at lower temperature through an inlet pipe 12 having adjustable damper 13 therein. The hot air passes through the pipe 11 to an intake connection 14 of a dispersion apparatus 15 driven by a motor 16. A material to be heated is supplied to the system in a divided condition through the upper end 17a of a vertical pipe 17, and the material passes to the intake of the dispersion apparatus 15. The dispersion apparatus 15 is constructed in such manner as to violently agitate the material and air supplied thereto, which forcibly brings the material in close contact over the entire surface thereof with the heated gas or air and promotes rapid heating and, for example, drying or calcining of the material. The dispersion apparatus also breaks up the material by impact, and impells the gas or air together with the resultant material in a divided condition to flow upwardly through the discharge outlet 18 and a vertical pipe 19, which is connected at its upper end to the intake of a classifier or separator 20. In flowing through the classifier 20 the gaseous medium with the entrained material is directed downwardly toward the opposite side wall, and the velocity of the gaseous medium is reduced. This causes relatively coarse portions of the material to move in the general direction of the arrow 21 and out of the gas stream until these coarse portions drop into the lower portion of the separator 20, or upon striking the opposite vertical wall 22 drop into the bottom of the separator.

The relatively coarse portions accumulate continuously during operation of the system, and pass downwardly through upper and lower tipping valves 23 and 24 respectively, having adjustable weights 25 and 26. These tipping valves are constructed in such manner that only one of the valves is open at one time. The construction of such valves is illustrated in Fig. 1 of U. S. Patent No. 2,047,568 to Lissman and the operation thereof is described therein. As a result, the gas does not pass through the tipping valves, but the coarse portions of material pass through the tipping valves 23 and 24, and through the vertical pipe 27 to a feeding and mixing tube 28 having a power driven helical feeding element 29 therein.

The material introduced into the system may also be supplied through the tube 28, and may be delivered thereto through bin 30. The material to be heated will ordinarily contain from five to sixty percent water upon being discharged from a screen, a filter, a centrifugal dryer, drying trays, or other suitable mechanical device for removing water. This material contains particles in a more or less finely divided condition, but may be caked, and if so it will be broken up by the action of the power driven feeder in the feeding tube 28. The dry relatively coarse portions of the material returned through pipe 27 are also thoroughly mixed with the wet feed to the system of the material to be heated, which promotes ease of handling and facilitates rapid drying of the feed, and the coarse material separated in classifier 20 is thus returned to the dispersion apparatus 15 for further treatment.

The relatively fine portions of material are entrained and carried through the classifier 20 with the stream of gaseous medium, and are discharged through the outlet 31. The particular construction of the classifier 20, and the method employed therein, may be varied as desired to meet particular requirements, and the type of classifier shown is not my invention. The construction and method herein disclosed are described and claimed in United States Patent No. 2,047,568 to Lissman granted July 14, 1936, and entitled "Method and apparatus for separating suspended particles from gases."

The gaseous medium and the suspended particles of solid material entrained therein are discharged from the classifier 20 into an inlet header 33 of a cyclone type separator 34. The gaseous medium and entrained material are discharged from the inlet header 33 downwardly and tangentially into a plurality of small cylindrical tubes 35. The solid particles are thus whirled and the major portion of the solid particles are effectively separated from the gas and pass downwardly through the lower tapered ends of the tubes 35 into a collecting hopper 36. The gas or air thus separated from the major portion of the relatively fine portions of the material flows upwardly through a plurality of cylindrical outlet tubes arranged coaxially within the upper end portions of tubes 35, and of smaller diameter than tubes 35. All of these outlet tubes communicate with a discharge outlet header 37, which surrounds the lower portion of the inlet header 33, and is separated therefrom by partitions. The gaseous medium is then discharged at 38 from the outlet header 37 to a stack, or to a secondary separator and collector 34a of any suitable type, as shown diagrammatically in Fig. 2, for removing therefrom an additional quantity of remaining suspended solids which ordinarily consist principally of extremely finely divided particles.

The material separated in separator 34 accumulates continuously during operation of the system in the collecting hopper 36 and passes downwardly therefrom through two tipping valves 39 and 40 (as shown and described in U. S. Patent No. 2,047,568 above mentioned) arranged in series, which permit the material to pass downwardly therethrough, but prevent the gas from passing through the valves. The material so discharged may be directed below the tipping valves 39 and 40 into a pipe 41 to be removed in whole or in part as a final product, or into a pipe 42 to be delivered in whole or in part to a feeding tube 43 having a power driven helical feeding element 44 therein, supplying the material through a pipe 45 to the inlet end of the feeding tube 28 where it is thoroughly mixed with the relatively coarse portions of the material supplied through the vertical pipe 27 and the feed of material supplied to the system from the bin 28. A pivoted gate 32 may be adjusted to different positions to direct the material from below the tipping valve 40, either wholly through pipe 41, wholly through pipe 42, or partly through each of these pipes.

Any type of dust collector may be used instead of the cyclone type separator 34 to meet particular requirements, such as a bag filter, scrubber, electrical precipitator, or any other type of collector for fine material. The construction herein disclosed is not my invention, but is disclosed and claimed in United States Patent No. 1,930,906 to Horne et al. granted October 17, 1933, and entitled "Apparatus for separating suspended particles from gases." Furthermore, when a secondary collector is used, as shown at 34a in Fig. 2, this collector may be of any suitable type, such as a cyclone, bag filter, scrubber, or electrical precipitator, and is preferably of such type and design as to have a higher efficiency of collection of very fine particles than the primary collector 34. For example, when using a primary collector 34 of the multiple tube cyclonic type above described, the secondary collector may be a bag filter or an efficient type of scrubber. The secondary collector may also be provided with discharge and return pipes 41a and 42a comparable to pipes 41 and 42 respectively, and means similar to gate 32 may be provided for controlling the delivery of material to one or both of these pipes.

The dispersion apparatus 15 is constructed to impell the entrained material in a more or less finely divided condition and the heated gas or air toward and through the conveying means or pipes connecting together in communication the various parts of the system. The dispersion apparatus 15 also breaks up or disperses by impact, the entrained material, and preferably includes an arrangement for returning to the dispersing portion relatively coarse portions of the material, thus preventing certain of the coarse portions from passing into the other parts of the system, and dispersing them in contact with the air or gas to promote more rapid drying, dehydrating, calcining or to produce any desired chemical, physical, or other change which may be effected by heating. A particular embodiment of a dispersion apparatus according to my invention is illustrated in the drawings.

Referring to Figs. 3 to 7, inclusive, this dispersion apparatus includes a housing 46 having horizontal hot gas intake connections 14 and 47. The connection 14 or 47 may be coupled to the hot gas pipe 11 for convenience, but in the present arrangement the connection 47 is closed by a removable cover plate 48, and the hot gas pipe 11 is connected to the connection 14. The housing 46 is mounted on a base 46a having an extension to which are secured bearings 49 and 50 of a shaft 51, which is driven through belts 52 by the motor 16 as shown in Fig. 1. The housing 46 has end walls 46' and 63 and an intermediate transverse vertical partition 53 dividing the interior of the housing into a disperser compartment 54, and a heated gas and material receiving compartment 55. The end wall 46' is shown as being removably secured to the end of the housing to provide access to the interior thereof. The partition 53 constitutes a substantially gas tight separation between these two compartments except for a circular central opening 56 through which material in a more or less divided condition and hot gas are supplied to the disperser compartment 54. The material is supplied downwardly to the compartment 55 of housing 46 through the vertical pipe 17, and drops into a transversely flared upper end 57 of a duct 58, the duct 58 being spaced from the end wall 46' of the housing and the flared end 57 being spaced from a top horizontal wall 59 of the housing about three sides of the duct to provide for the admission of hot air with the material into the duct 58. This duct 58 has an upper segmental section 60a and a lower circular disk portion 60 secured as by bolts 61 to the transverse partition 53 about a circular opening 62 therein. The compartment 55 thus maintains hot air in heat exchange relation with the dispersion compartment, and the hot air and material are supplied therethrough to the dispersion compartment.

End wall 63 of the housing 46 is parallel to the partition 53 and these walls constitute successive end walls of an involute casing 64 secured within the disperser compartment 54 and having a vertical outlet opening 65 discharging into the pipe 19. Adjacent the outlet opening 65 is an auxiliary outlet opening 66. The duct 58 directs the heated gas and entrained material through the inlet opening 56 and a removable filler plate 56—a axially into the interior of the involute casing 64. A rotatable element or impeller 67 is arranged within the casing coaxially with the inlet opening 56 between the successive end wall means 53 and 63 and is mounted on the shaft 51 and rotated in the direction indicated by the arrow at 67a. The filler plate 56a provides close clearance at the adjacent end of the rotatable element to prevent undue leakage. The rotatable element includes radially extending blades 68 mounted between axially spaced disks 69 and 70 attached to a hub 71 by the blades 68, which extend from the hub 71 to the periphery of the disks. The disk 70 is provided with a central opening 72 coaxial with and slightly larger than the inlet opening 56, so as to admit the heated gas and the entrained material into the central space formed in the interior of the rotatable element by the inclined edges of the narrow portions 68a of the blades connected to the hub. A plurality of openings are formed in the blades 68, which in the present construction are in the form of narrow axially extending slots 73 in the blades extending between the disks 69 and 70 to cause the material to pass through the slots successively in moving outwardly. The material also successively strikes the blades by passing through the slots 73 during movement from the axial inlet to the periphery of the rotatable element. In this manner the material is subjected to successive impacts to insure effective dispersing of the same. It is preferred to make the narrowed portions 68a of the blades separate from the parts 68b, 68c, and 68d, which are spaced apart to form the axially extending slots 73, these parts being secured to disks 69 and 70 in any suitable manner. The disks 69 and 70, as well as the other parts of the rotatable element, are made to provide free running clearance within the casing.

The blades of the rotatable element may be varied in construction and arrangement to obtain the most effective results. For example, the blades may in whole or in part be curved or inclined forwardly in the direction of rotation toward their outer edges as indicated at 68' in Fig. 8, or the separate portions thereof may be inclined or curved in a similar manner and arranged in stepped relation as indicated at 68a', 68b', 68c', and 68d' in Fig. 9. As another example, the slots in the blades may be inclined outwardly with respect to the axis in or direction toward the inlet end of the rotatable element 67, as shown at 73' in Fig. 10. By utilizing one or more of these features of construction, alone or in combination, the impelling action may be made more or less pronounced, the dispersion effect may be increased, or more even distribution of material and gas or air moving outwardly over the surfaces of the blades may be obtained. Any of these modifications are intended to be included within the scope of the present invention, and the rotatable element may in any case be defined as having radially extending blades provided with axially extending slots, because the blades and slots extend in directions having substantial radial and axial components, respectively.

In this dispersion apparatus the heated gas and entrained material are impelled by the rotatable member and the material is dispersed by successive impacts against the blades. Furthermore, the hot gas is whirled in intimate contact with the material, so as to cause the hot gas to intimately contact the entire surface of each particle of the material, and thereby promotes rapid heating and, for example, drying or calcining of the material. The involute casing 64 efficiently converts the velocity head imparted to the gas and entrained material into a pressure head, so that they flow through the outlet opening 65 to the remainder of the system.

The whirling of the hot gas in the involute casing 64 causes relatively coarse portions of the material to become concentrated in the peripheral portion of the curved path of flow. In order to return these relatively coarse portions from adjacent the outlet opening to adjacent the inlet opening 56, a deflecting vane 74 is arranged within the casing adjacent the auxiliary outlet opening 66 to provide for adjustment as desired. As shown in Figs. 6 and 7, the vane 74 is pivotally mounted by casting integral ears 75 at the upper corners thereof having bosses, which are bored at 76 to receive pivot pins 77 threaded into the partition 53 and the end wall 63 and retained in place by lock nuts 78. The ends of the pins 77 engage the bottoms of the holes in which they engage, so as to retain the stationary vane 74 in position transversely with respect to the adjacent walls. The vane 74 is shown in Fig. 6 in its fully open position, and may be adjusted by means of a rotatable shaft 79 mounted in bearings 80 and 80' attached to the walls 53 and 63 respectively and having eccentrics 81 fixed thereon in the same angular relation and arranged between flat plates 82 and rectangular straps 83 which are bolted to the vane 74. Upon turning the shaft 79 the eccentrics operate to swing the vane until it is in position to substantially close the auxiliary outlet 66, as partly shown in dotted lines at 74'. The shaft 79 projects through bearing 80' to a position outside the housing, and is turned by a hand wheel 84 having a pointer 85 on the hub thereof cooperating with a dial 86 to indicate the position of the vane 74. In order to shield the operating eccentrics from the entrained material passing through opening 66, and to minimize turbulence in the air and material, a flange 74a is formed integral with the vane having a face substantially parallel with a wall 88 extending from the lower edge of the auxiliary outlet opening 66 to the top wall 59 and between partition 53 and end wall 63 to form therewith an auxiliary outlet passage 89. An opening 91 in top wall 59 extends both sides of partition 53, and a return conduit 92 is disposed over this opening to provide communication from passage 89 to the top of compartment 55 at a position above the flared upper end 57 of duct 58. The desired part of the peripheral portion of the whirling gas and entrained coarse portions of material are thus directed by the vane 74 through the auxiliary outlet opening 66, and thence through passage 89 and conduit 92 into the compartment 55, where they meet the hot gas entering the upper end of duct 58 and are returned through said duct to the disperser compartment 54. By adjusting vane 74 to intermediate positions, the proportion of gas and entrained material so returned may be controlled, or the vane may be moved to its closed position in order to substantially prevent the return of any such material in this manner.

In the operation of the foregoing described material heating system, air or any other suitable vapor or gas is heated in the furnace 10, and discharged therefrom through the pipe 11. Fresh air or gas is admitted through the pipe 12 to the pipe 11 to obtain the desired temperature of the hot gas or air supplied to the system, and the amount of fresh air admitted is controlled by the adjustable damper 13. This heated mixture of air or gas is supplied through the pipe 11 into the receiving compartment 55 and passes upwardly around the vertical duct 58. At the upper end of compartment 55 the gas passes inwardly and enters duct 58 and passes downward therethrough. The material to be heated is supplied through tube 28 and pipe 17 and is entrained by the gas as the latter enters and flows downwardly in the duct 58 and thence into the axial inlet 56 of the dispersion apparatus 15. The rotatable element of the dispersion apparatus is driven by the motor 16 continuously during operation of the system, and the gas-impelling action thereof serves to maintain the flow of gas through the system. The hot gas with the entrained material enters the interior of the rotatable element 67, which is rotating at high speed, and this hot gas and material are impelled to violently agitate them and cause the gas to scrub thoroughly the entire surface of the material, which effects rapid heating of the material in the dispersion apparatus, and this is facilitated by the heating effect of the air or gas receiving compartment 55 being in heat exchange with the disperser compartment 54. Furthermore, the rotatable element 67 subjects the material to successive dispersing impacts as the material passes successively through the slots 73, and comes in contact with the successive blades following, until the material is discharged from the rotatable element into the surrounding portion of the casing 64. The blades 68 also impell the gas and entrained material to flow toward the outlet pipe 19 and through the remainder of the system, so that the blades of the rotatable element serve the purpose of dispersing the material and impelling the gas and entrained material. Relatively coarse portions of the material are concentrated in the peripheral portion of the curved path, and are directed by the adjustable vane 74 and returned as above described for further dispersion. This insures complete dispersing in the dispersion apparatus, and effects more complete and rapid heating and, for example, drying or calcining, of the material.

The gas and the entrained material are discharged from the dispersion apparatus through the vertical pipe 19 and pass horizontally at the upper end of the pipe into the classifier 20. The relatively coarse portions of the material are directed downwardly out of the stream of gas, and to the lower part of the classifier, whence these separated relatively coarse portions are discharged through the series of tipping, or other suitable, valves 23 and 24 to the feeding and mixing tube 28, without any downward escape of gas through these valves, and are mixed in tube 28 with the feed of material supplied to the system through the bin 30 and returned to the system for further dispersion and heat treatment.

The relatively fine portions of material remain entrained in the gas passing through the outlet 31 of the classifier 20, and are conveyed with the gas to the cyclone separator 34. The dried, calcined, or otherwise heat-treated solids are separated in separator 34 from the gas and fall into hopper 36 and then pass downwardly through the valves 39 and 40, and may be discharged in whole or in part through the pipe 41 as a final product of the system, or may be partly returned through the pipe 42 to the feeding tube 43 from whence they are supplied by the feeding screw 44 to the feeding and mixing tube 28, and mixed therein with the relatively coarse portions from the pipe 27 and with the feed from the bin 30, and thus returned to the system.

It will be observed that the dispersed material is subjected to contact with the gas not only in the dispersion apparatus 15 but also during passage of the gas and suspended particles through the remaining portions of the system, including pipe 19, classifier 20, and separator 34, and such material is therefore heated by the gas from the time it enters the gas stream in the dispersion apparatus 15 until it is separated therefrom in separator 34.

Figure 2:
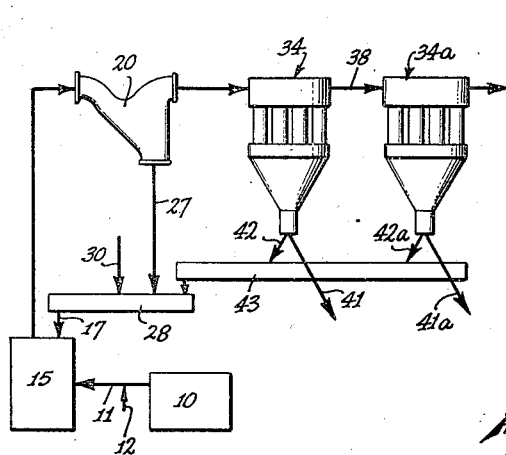
Fig. 2 is a diagrammatic view of a material heating system embodying a modification of the construction shown in Fig. 1.
Figure 5:
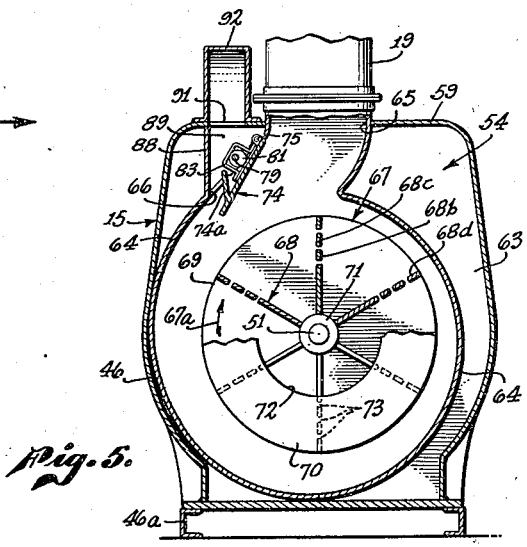
Fig. 5 is a sectional view on the line 5—5 in Fig. 3.

In the operation of the modified system shown in Fig. 2, the collected material from the separator 34 may be returned in whole or in part through the pipe 42 and thus to the dispersing apparatus 15, and the material collected in separator 34a may be discharged through pipe 41a as a final product. This latter material will comprise the most finely divided portion of the heat-treated material, and this method of operation will be advantageous where a very finely divided product is desired. However, a part of the material from separator 34 may also be discharged as a final product, through pipe 41, and may be either sold or used separately or mixed with the product discharged through pipe 41a.

In other cases, where it is desired to obtain a product free from extremely fine particles, the very fine material collected in separator 34a may be returned to the system through pipe 42a, and the material collected in separator 34 may be discharged as a final product through pipe 41, or may be partly so discharged and partly returned to the system through pipe 42.

The extent of dispersion and heat treatment to which the material is subjected may be controlled by designing or adjusting the classifier 20 to separate a desired proportion of relatively coarse material to be returned for further treatment, and further, if desired, by returning any desired proportion of the material collected in separator 34 or 34a. When the system is employed for the purpose of drying materials, it is also to be noted that the separated coarse portions returned from classifier 20 as well as any collected material returned from separator 34 or 34a will be in a more or less completely dried condition. The system may therefore be used for the drying of material whose liquid content is so high that it normally could not be satisfactorily handled by mechanical feeding means such as the screw feeder 29 and would be difficult to properly disperse in the hot gas. By mixing such material in feed tube 28 with the relatively dry returned material, there may be produced a mixture which is of sufficiently low liquid content to be satisfactorily fed into the dispersion apparatus 15 and dispersed in the hot gas therein.

I claim:

1. In a material dispersion apparatus, the combination comprising: a casing; means including a rotatable element in said casing for impelling a gas through said casing and for dispersing material supplied thereto, said rotatable element comprising a plurality of radially extending blades each having portions for impelling gas through said casing and each including means for providing successive dispersing impact of said material; housing means defining a compartment at one end of said casing for retaining a gas in heat exchange relation with said casing; means for supplying material to said compartment; and means within said compartment and arranged at said one end of said casing for directing gas from said compartment and material from said supplying means into said casing.

2. A material dispersion apparatus comprising: a housing; a vertical partition dividing the space within the housing into dispersing and receiving compartments, the partition having an opening for communication between the two compartments; a rotatable gas impelling and material dispersing member in the dispersing compartment; separate gas and material inlet means for the receiving compartment respectively located at the side and top of the housing; and a duct within the receiving compartment receiving material and gas at its upper end and discharging the gas and material at its lower end through the partition opening into the dispersing compartment, the duct walls being placed in front of the gas inlet to deflect incoming gas upwardly in the receiving compartment.

3. In a material heating system, a dispersion apparatus comprising a casing having an inlet opening and a plurality of peripheral outlet openings; means including a rotatable element in said casing for impelling a gas through said casing and dispersing material supplied thereto, said rotatable element comprising a plurality of radially extending blades each having portions for impelling gas through said casing and each having openings therein arranged to provide successive dispersing impact of said material; and means associated with said casing for directing gas and relatively coarse portions of said material from one of said peripheral outlet openings to said rotatable element to disperse further said relatively coarse portions of material.

4. In a material heating system, a dispersion apparatus comprising a casing having an inlet opening and a plurality of peripheral outlet openings; means including a rotatable element in said casing for impelling a gas through said casing and dispersing material supplied thereto, said rotatable element comprising a plurality of radially extending blades each having portions for impelling gas through said casing and each having openings therein arranged to provide successive dispersing impact of said material; means associated with said casing for directing gas and relatively coarse portions of said material from one of said peripheral outlet openings to said rotatable element to disperse further said relatively coarse portions of material; and means including an adjustable member arranged adjacent one of said casing outlet openings for controlling the amount of relatively coarse portions returned to said rotatable element.

5. In a material dispersion apparatus, the combination comprising: casing means defining an involute chamber having spaced parallel side walls, one of which side walls is provided with an inlet opening, and a substantially unobstructed peripheral gas outlet opening disposed adjacent the maximum involute diameter; a gas impelling and material dispersing member rotatably mounted within said casing for rotation parallel to said side walls, said gas impelling and material dispersing member comprising a hub member, a plurality of axially and generally radially extending blade members and two axially spaced disks intersecuring said blade members at the respective axial ends thereof, one of said disks being closely spaced with respect to said one side wall of said casing means and having an axial opening axially aligned with said inlet opening, and each of said blade members extending inwardly from the periphery of said disks into proximity with said hub member and being each provided with a plurality of axially extending openings defining a plurality of radially separated passages whereby a portion of the gas and material under treatment by said gas impelling and material dispersing member is caused to pass through said passages during rotation thereof within said casing.

NORMAN M. McGRANE.